US010708751B2

(12) United States Patent
Patil et al.

(10) Patent No.: US 10,708,751 B2
(45) Date of Patent: Jul. 7, 2020

(54) DETECTION OF TECHNOLOGIES FOR COEXISTENCE

(71) Applicant: QUALCOMM Incorporated, San Diego, CA (US)

(72) Inventors: Shailesh Patil, Raritan, NJ (US); Kapil Gulati, Dover, DE (US); Gaurav Gupta, Los Angeles, CA (US)

(73) Assignee: QUALCOMM Incorporated, San Diego, CA (US)

(*) Notice: Subject to any disclaimer, the term of this patent is extended or adjusted under 35 U.S.C. 154(b) by 108 days.

(21) Appl. No.: 15/617,765

(22) Filed: Jun. 8, 2017

(65) Prior Publication Data

US 2018/0049014 A1 Feb. 15, 2018

Related U.S. Application Data

(60) Provisional application No. 62/373,707, filed on Aug. 11, 2016.

(51) Int. Cl.
| | |
|---|---|
| H04W 8/00 | (2009.01) |
| H04W 4/40 | (2018.01) |
| H04W 16/14 | (2009.01) |
| H04W 72/08 | (2009.01) |
| H04L 5/00 | (2006.01) |
| H04W 16/10 | (2009.01) |
| H04W 88/06 | (2009.01) |

(52) U.S. Cl.
CPC .......... *H04W 8/005* (2013.01); *H04L 5/0051* (2013.01); *H04W 4/40* (2018.02); *H04W 16/14* (2013.01); *H04W 72/082* (2013.01); *H04W 16/10* (2013.01); *H04W 88/06* (2013.01)

(58) Field of Classification Search
None
See application file for complete search history.

(56) References Cited

U.S. PATENT DOCUMENTS 7,010,071 B1 * 3/2006 Michel ................ H04B 1/7073
375/354
2012/0275320 A1 11/2012 Iyer
(Continued)

FOREIGN PATENT DOCUMENTS

WO 2014081421 A1 5/2014

OTHER PUBLICATIONS

R1-164540, 3GPP TSG RAN WG1 Meeting #85, Nanjing, China, May 23-27, 2016.*
(Continued)

*Primary Examiner* — Alex Skripnikov
(74) *Attorney, Agent, or Firm* — Arent Fox LLP

(57) ABSTRACT

An apparatus, such as a user equipment or a vehicle, may receive a signal associated with vehicle-to-everything (V2X) communication. The apparatus may determine a total energy that corresponds to the received signal, such as by measuring the energy on one or more resources. The apparatus may determine a fractional energy associated with a first technology of the total energy, such as by detecting a sequence associated with a first technology included in the received signal and determining the energy with which the detected sequence is received. The apparatus may determine presence of a second technology based on the determined fractional energy.

28 Claims, 10 Drawing Sheets

(56) References Cited

U.S. PATENT DOCUMENTS

| | | | |
|---|---|---|---|
| 2015/0031309 A1 | 1/2015 | Chae et al. | |
| 2016/0173361 A1 | 6/2016 | Somasundaram et al. | |
| 2016/0295624 A1* | 10/2016 | Novlan | H04W 76/14 |
| 2017/0289733 A1* | 10/2017 | Rajagopal | H04W 4/70 |
| 2018/0123760 A1* | 5/2018 | Yang | H04L 5/0051 |
| 2018/0359782 A1* | 12/2018 | Tan Bergstrom | H04W 74/004 |
| 2019/0116475 A1* | 4/2019 | Lee | H04W 4/40 |
| 2019/0159218 A1* | 5/2019 | Seo | H04W 72/0446 |

OTHER PUBLICATIONS

International Search Report and Written Opinion—PCT/US2017/036860—ISA/EPO—dated Sep. 25, 2017.

* cited by examiner

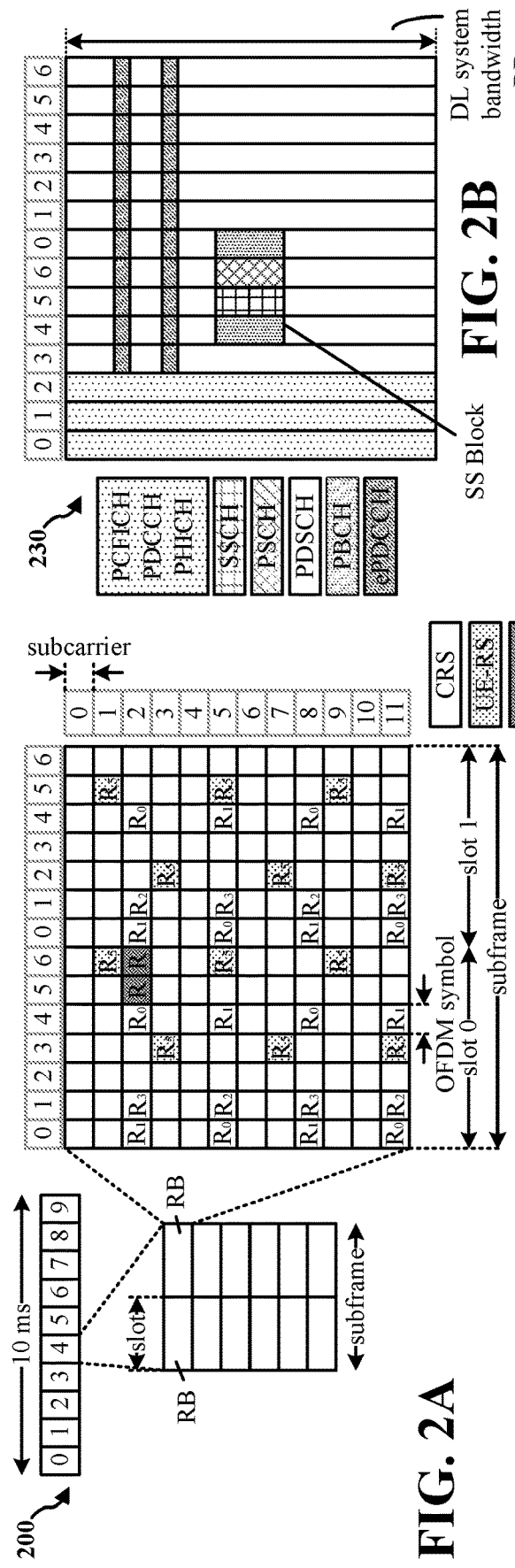
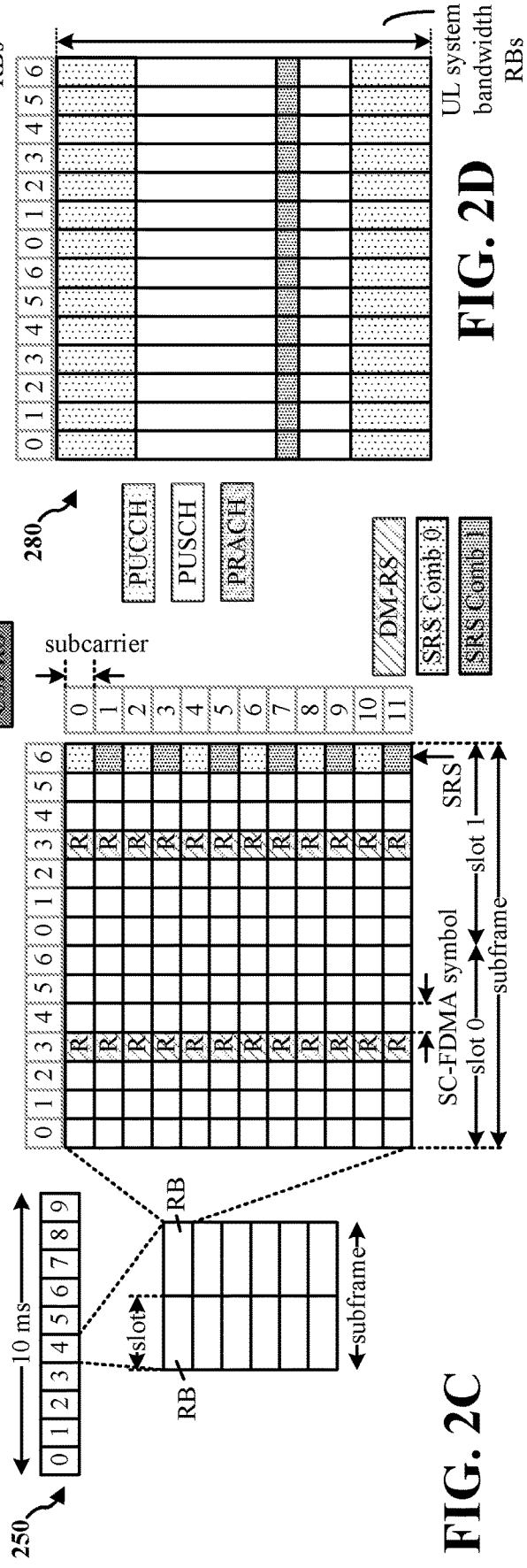

DETECTION OF TECHNOLOGIES FOR COEXISTENCE

CROSS-REFERENCE TO RELATED APPLICATION(S)

This application claims the benefit of U.S. Provisional Application Ser. No. 62/373,707, entitled "Detection of Another Technology for Coexistence" and filed on Aug. 11, 2016, which is expressly incorporated by reference herein in its entirety.

BACKGROUND

Field

The present disclosure relates generally to communication systems, and more particularly, to a device that is configured to detect energy of another technology.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

While some aspects may be described with respect to a particular technology (e.g., 5G NR, LTE, etc.), the present disclosure is applicable to any number of technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Approaches described herein may be applicable to one or more technologies, including 4G, 5G, or another technology.

In an aspect of the disclosure, a method, a computer-readable medium, and an apparatus are provided. An apparatus may receive a signal associated with vehicle-to-everything (V2X) communication. The apparatus may determine a total energy that corresponds to the received signal. The apparatus may determine a fractional energy of the total energy based on a sequence included in the received signal, the sequence associated with a first technology. The apparatus may determine presence of a second technology based on the determined fractional energy.

In an aspect, the first technology includes one of Long Term Evolution (LTE), LTE-Advanced, or fifth generation (5G), and wherein the second technology includes Dedicated Short Range Communications (DSRC). In an aspect, the sequence comprises a pilot sequence of known length is used for demodulation. In an aspect, the sequence is predefined for a time-frequency resource for one or more time-frequency resources allocated for the sequence. In an aspect, the sequence is predefined or dynamically configured by a base station. In an aspect, the sequence repeats on a plurality of physical resource block pairs of a subframe to allow for different lengths. In an aspect, the sequence is included in one half of a last symbol of a subframe. In an aspect, the determination of the presence of a second technology based on the determined fractional energy includes comparison of the determined fractional energy to a predetermined threshold; and determination of the presence of the second technology based on the comparison. In an aspect, the apparatus may further select a different channel for communication based on the determined presence of the second technology or switch to the second technology for communication based on the determined presence of the second technology.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

DETAILED DESCRIPTION

Figure 1:
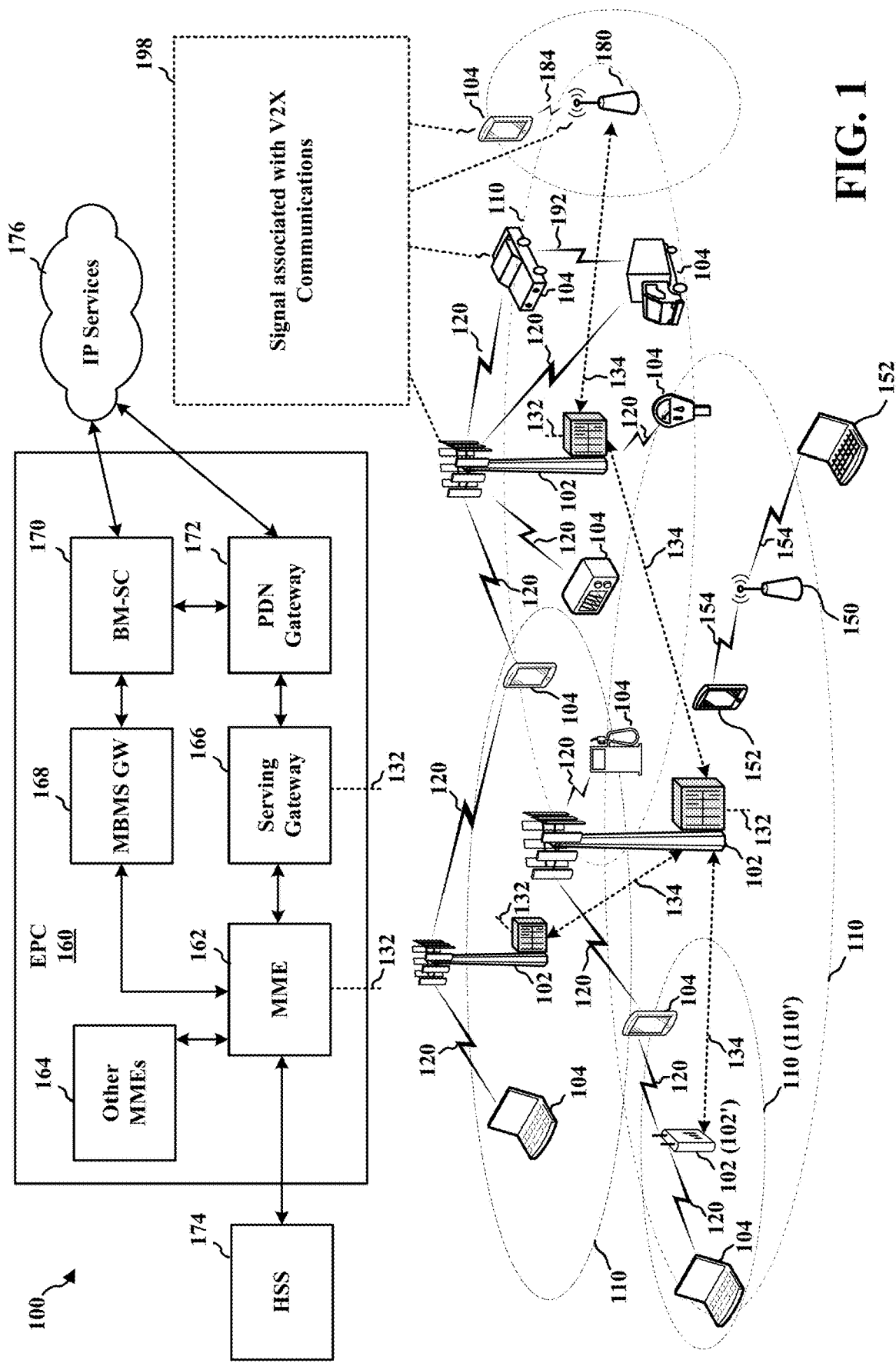
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 (which may be a vehicle or a component thereof) may be configured to receive a signal (e.g., a signal associated with vehicle-to-everything communication). The signal may include a signal from a base station 102/base station 180 that is operating with a first technology (e.g., LTE, Dedicated Short Range Communications, fifth generation (5G), etc.) that is the same as the technology with which the UE 104 is operating. However, the signal received at the UE 104 may further include an interfering signal from another device (e.g., another eNB or another UE) that is operating with a different technology than the UE 104. The UE 104 may be configured to determine the total energy included in the received signal (e.g., the energy of both the signal associated with the first technology and the interfering signal associated with the second technology).

The UE 104 may be configured to detect a sequence included in the signal. The sequence may be included in the signal from the base station 102/base station 180 and may be associated with the first technology. The UE 104 may be configured to determine a fractional energy (e.g., a fraction of the total energy) that corresponds to the sequence included in the received signal. For example, the UE 104 may be configured to compare the fractional energy (e.g., a percentage of the total energy corresponding to the sequence) to a predetermined threshold. The UE 104 may be configured to determine the presence of the second technology based on the comparison. For example, if the fractional energy falls below a threshold value, then the UE 104 may assume that the received power of the second technology is dominant and/or unsatisfactorily degrades the intended signal from the base station 102/base station 180. In response, the UE 104 may switch channels or switch to the second technology.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
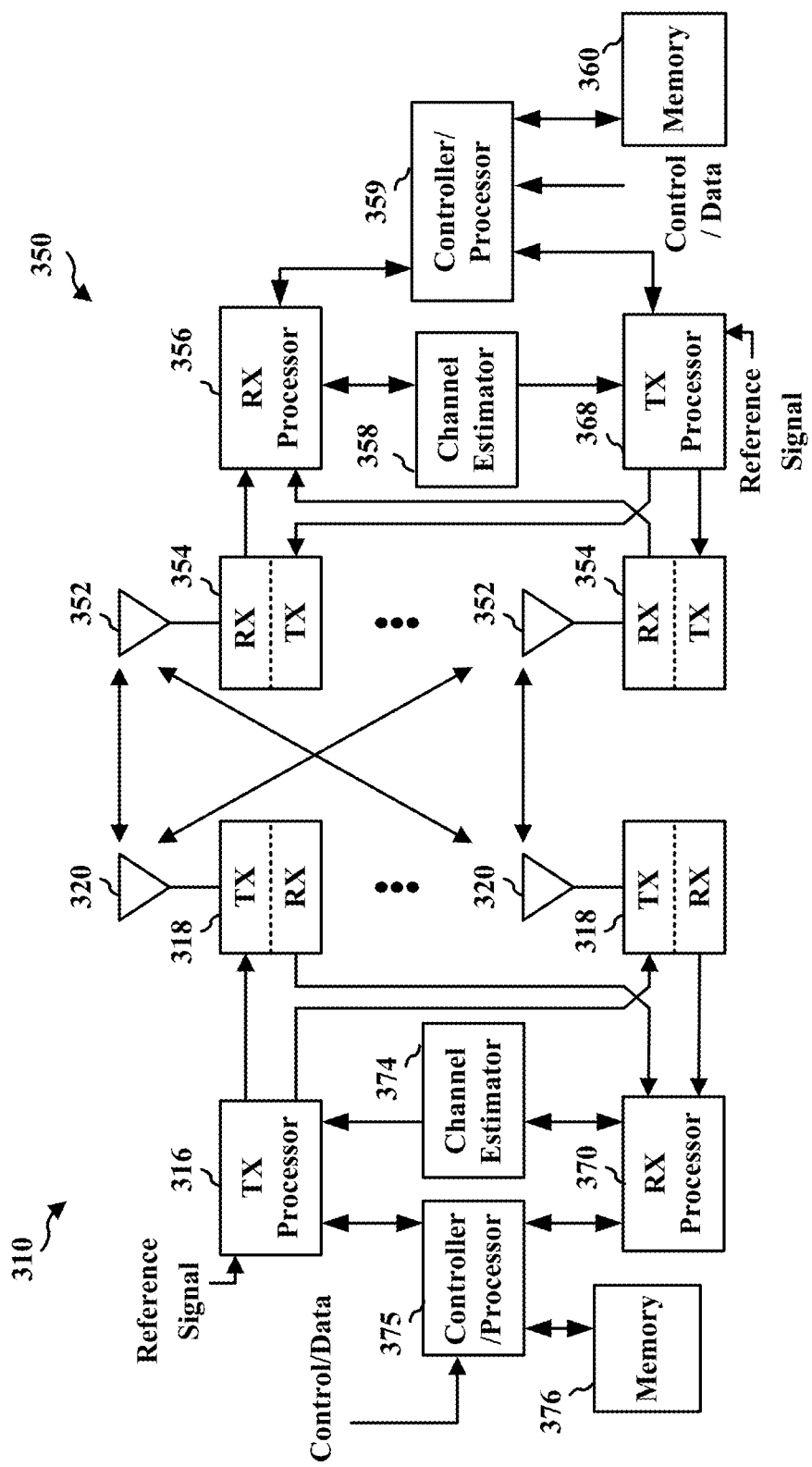
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
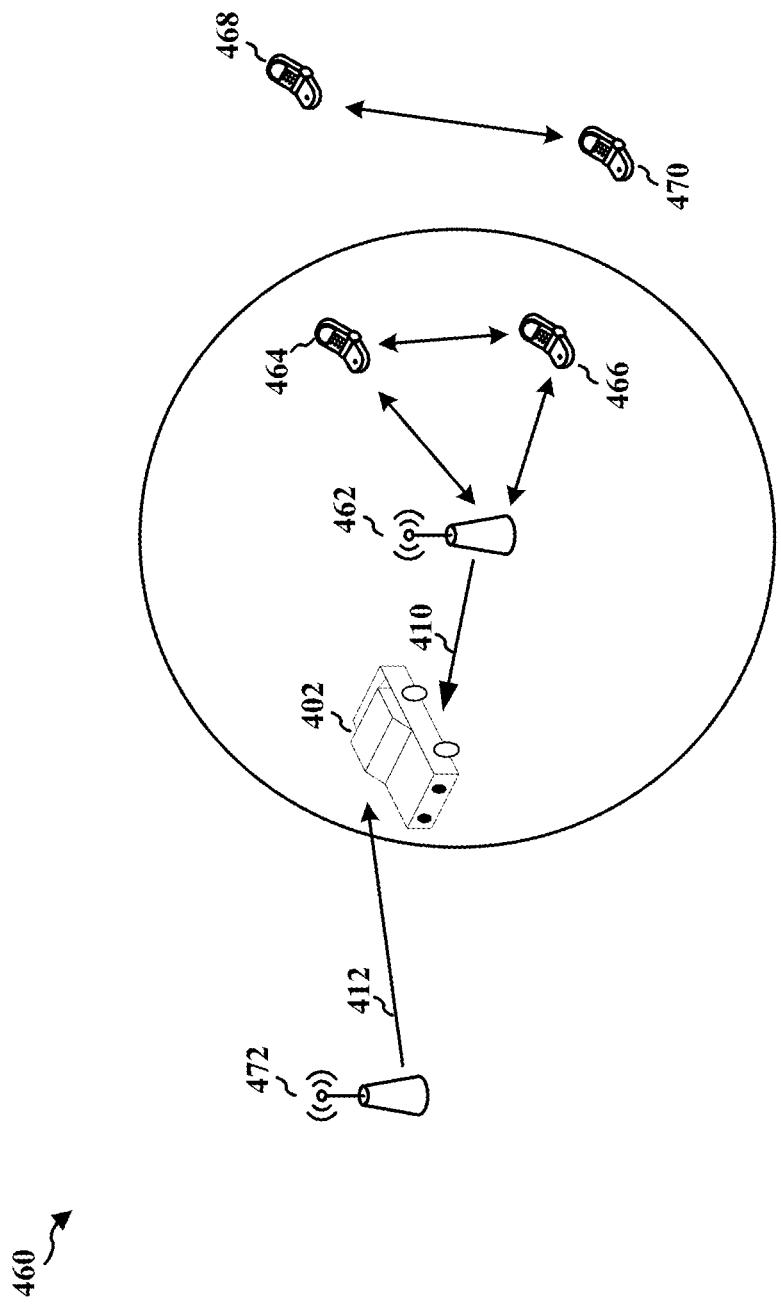
FIG. 4 is a diagram of a wireless communications system.

FIG. 4 is a diagram of a device-to-device (D2D) communications system 460. The D2D communications system 460 includes a plurality of UEs 464, 466, 468, 470.

The D2D communications system 460 may overlap with another communications system, such as for example, a wireless wide area network (WWAN). Some of the UEs 464, 466, 468, 470 may communicate together in device-to-device (D2D) communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

The D2D communications system 460 may further include at least one vehicle 402 configured for vehicle-to-everything (V2X) communications, which may include vehicle-to-vehicle (V2V) communications. In some aspects, the vehicle 402 may be configured to communicate in a specific spectrum, such as an intelligent transport systems (ITS) spectrum. The ITS spectrum may be unlicensed, and therefore a plurality of different technologies may use the ITS spectrum for communication, including LTE, LTE-Advanced, Licensed Assisted Access (LAA), Dedicated Short Range Communications (DSRC), 5G, new radio (NR), 4G, and the like. The foregoing list of technologies is to be regarded as illustrative, and is not meant to be exhaustive.

The vehicle 402 may communicate according to a first technology (e.g., LTE). For example, the vehicle 402 may communicate with a first base station 462 using the first technology. However, the vehicle 402 may be proximate to another transmitter (e.g., the base station 472) that is operating using a second technology (e.g., DSRC), which may interfere with communications by the vehicle 402 using the first technology.

For coexistence between multiple technologies, the vehicle 402 may benefit from detecting the presence of a second technology (e.g., DSRC). Thus, the vehicle 402 may benefit from a reliable detection scheme that is also scalable as new technologies utilize the ITS spectrum.

According to one approach, a device may detect the other technology using a sequence/preamble transmission by that technology. However, this approach may not be readily scalable to multiple technologies. In particular, this is difficult when the numerology (e.g., occupied bandwidth, sampling frequency, etc.) and modulation of the two technologies are different. Further, this approach may bias the design of the sequence/preamble towards the minimum common denominator among the technologies in terms of the numerology/modulation/etc.

However, the present disclosure may describe detection of a device's own technology, in the context of detecting energy that exceeds a threshold that that technology expects to be decodable, and then looking at the fraction of that energy that was detected as the device's own technology. Since this approach is based on detecting a device's own technology, this approach may be scalable and may not require any common understanding on sequence/preamble design among multiple technologies. While the present disclosure describes such a device in the context of a vehicle 402, one of ordinary skill would understand that the disclosure may be applied to any device, such as one of the illustrated UEs.

Detection of the first technology of the vehicle 402 may be based on successful decoding of the energy (e.g., cyclic redundancy check (CRC) pass at the physical layer). For example, the vehicle 402 may detect the first technology using detection of the pilot sequences that are transmitted as a part of the transmissions. However, detection may be difficult at the vehicle 402 due to varying sequences (e.g., length, base sequences, etc.) that can be used by the transmissions. Thus, a particular pilot/sequence transmission may enable this detection at the receiver vehicle 402.

In an aspect, the vehicle 402 may receive a signal carried on a resource (e.g., a resource element, a resource block, etc.) that includes a first signal 410 from the first base station 462 and a second signal 412 from the second base station 472. Therefore, the total energy (e.g., on a resource element, on a resource block, etc.) received at the vehicle 402 may be the aggregate of the first signal 410 and the second signal 412.

The vehicle 402 may be configured to determine the total energy that corresponds to this received signal (e.g., the aggregate or sum energy of the first and second signals 410, 412). For example, the vehicle 402 may detect the total energy on at least one resource that carries the first signal 410 and the second signal 412.

The vehicle 402 may be configured to detect a sequence in the first signal 410. The sequence may be associated with the first technology. The sequence may be, for example, a pilot sequence (or set of sequences) of a known length that is used for demodulation at a receiver of the vehicle 402. In an aspect, the sequence may be predefined for a time-frequency resource for which the time-frequency resource is allocated. For example, the sequence may be defined in a standard (e.g., 3GPP standard) and may be associated with one or more resources. The vehicle 402 may have this information stored therein, and the vehicle may access this stored information to determine resources to monitor and a sequence to expect on those monitored resources. In an aspect, the sequence may be dynamically configured by the first base station 462 and signaled to the vehicle 402 (e.g., in a system information block). In an aspect, the first base station 462 may send, to the vehicle 402, information indicating one or more resources that are to carry the sequence.

In another aspect, the sequence may repeat on a plurality of PRBs of a subframe. This repetition may allow sequences to be of different lengths. In an aspect, the vehicle 402 may measure the energy on at least one PRB of the plurality of PRBs.

In another aspect, the sequence may be included in one half of a last symbol of a subframe, such as a symbol that is used for transmission/reception turnaround and/or downlink timing adjustment.

In an aspect, the vehicle 402 may determine the fractional energy of the total energy based on the sequence included in the received signal. For example, the vehicle 402 may select the first signal 410 and identify the sequence carried therein. The vehicle 402 may detect the energy with which the sequence was received on one or more resources. In other words, the vehicle 402 may detect the fractional energy of the sequence included in the first signal 410.

In one aspect, the vehicle 402 may determine a percentage of the aggregate energy of the first and second signals 410, 412 that corresponds to the sequence included in the first signal 410. That is, the vehicle 402 may detect the energy with which the sequence was received, and the vehicle may determine the percentage of the total detected energy that is attributable to the received sequence.

Based on this fractional energy, the vehicle 402 may determine the presence of the second technology (corresponding to the second signal 412). For example, the vehicle 402 may compare the determined fractional energy to a predetermined threshold and determine the presence of the second technology based on the comparison. For example, if the fractional energy associated with detection of the sequence included in the first signal 410 does not meet or exceed a threshold, then the vehicle 402 may determine that the second technology is present and interferes with communication using the first technology. In other words, the energy of the second technology may be dominate and/or may unacceptably degrade communication via the first technology.

Based on the detection of the presence of the second technology, the vehicle 402 may select a different channel for communication. For example, if the vehicle 402 determines that the second technology is dominate or unsatisfactorily interferes with the first technology, then the vehicle 402 may select a different channel for communication. In one aspect, the vehicle 402 may select different resource(s) for communication and/or may provide feedback (e.g., to the first base station 462) that indicates the detected interference from the second technology. For example, the vehicle 402 may transmit CQI or another indication of channel quality that indicates the presence of the second technology (e.g., interference caused by the second signal 412), and the first base station 462 may assign different resource(s) to the vehicle 402.

In another aspect, the vehicle 402 may switch to using the second technology based on the detection of the presence of the second technology. For example, if the vehicle 402 determines that the second technology is dominate or unsatisfactorily interferes with the first technology, then the vehicle 402 may select the second technology for communication. The vehicle 402 may determine if the second technology is suitable for data communication with the vehicle 402. The vehicle 402 may then switch to the second technology, such as by switching to a different chain and/or transmitter/receiver (e.g., in the case of a multi-modem UE).

The vehicle 402 may continue to communicate with the first base station 462 (e.g., if the first base station 462 is capable of communicating according to the second technology) the vehicle 402 may communicate with a different base station (e.g., the second base station 472).

Figure 5:
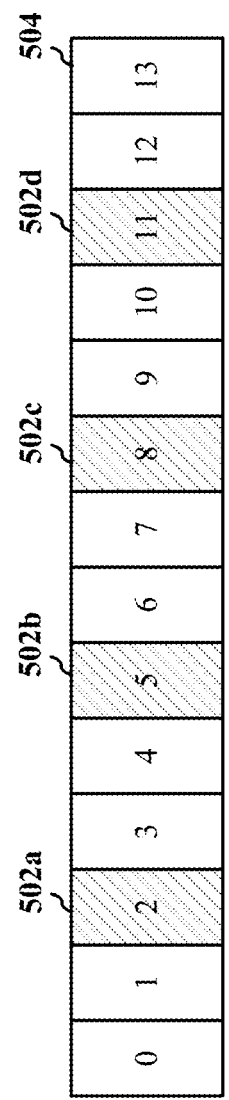
FIG. 5 is a diagram of a subframe.

FIG. 5 is a block diagram of a subframe 500. In an aspect, the subframe 500 includes a plurality of slots, numbered 0 through 13. In an aspect, the subframe 500 may be used for sidelink transmissions for V2X communications. In an aspect, the subframe 500 may carry a physical channel. In an aspect, the subframe 500 may be included in the first signal 410.

According to aspects, the subframe 500 may carry a plurality of reference signals 502. For control transmissions, a first reference signal 502a may fixed in specification or standard (e.g., fixed sequence, length, etc.), such as one or more standards promulgated by 3GPP for communication according to a technology (e.g., 4G, LTE, 5G, NR, etc.). The first reference signal 502a may be detected at the receiver UEs (e.g., the vehicle 402).

For data transmissions, however, the base sequence and length is variable. The base sequence may be a function of an identifier (ID) (e.g., a UE ID, which may be an ID of the vehicle 402), and the length may be a function of number of RBs used. At the receiver (e.g., the vehicle 402), the base sequence may be unknown without a successful decode of control information (e.g., included in a MIB or SIB). However, the detection of a transmission of a first technology transmission at a level below the decoding signal-to-interference-plus-noise ratio (SINR) level may be achieved without knowing the base sequence. According to an aspect, the receiver may have multiple hypotheses for different sequences and different RB size possibilities (e.g., associated with a base sequence)—however, multiple hypotheses may increase complexity at the receiver. In the subframe 500, then, a first reference signal 502a may carry a sequence that is a pilot sequence of a known length. The additional reference signals 502b, 502c, 502d may carry a same pilot sequence. The known length may be signaled to the receiver (e.g., signaled to the vehicle 402 by the first base station 462) and/or may be defined in one or more standards (e.g., 3GPP standards).

Figure 6:
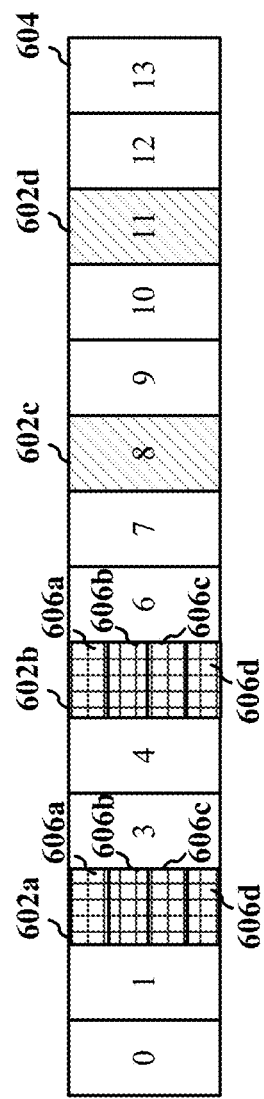
FIG. 6 is a diagram of a subframe.

FIG. 6 is a block diagram of a subframe 600. In an aspect, the subframe 600 includes a plurality of slots, numbered 0 through 13. In an aspect, the subframe 600 may be used for sidelink transmissions for V2X communications. In an aspect, the subframe 600 may carry a physical channel. In an aspect, the subframe 600 may be included in the first signal 410.

According to aspects, the subframe 600 may carry a plurality of reference signals 602. In one aspect, a reference signal 602 may carry a sequence, which may be known for each time-frequency resource of allocation (e.g., fixed, configured dynamically by the network (e.g., the first base station 462), defined in one or more standards (e.g., 3GPP standards), or preconfigured in a UE (e.g., the vehicle 402)). In aspects, the reference signals 602 may carry a plurality of sequences 606. For example, for V2X transmissions, the sequence 606a, 606b, 606c, 606d may repeat for every PRB pair (e.g., repetitions of length 12 in the frequency domain to span the entire transmission bandwidth). The repetition of the sequence 606a, 606b, 606c, 606d may allow for different lengths of sequences.

Figure 7:
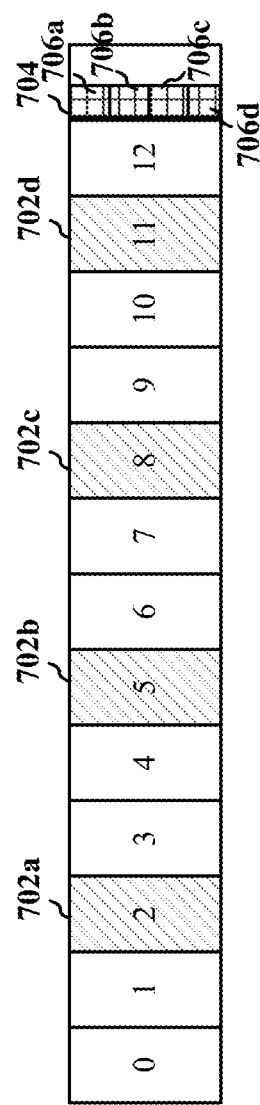
FIG. 7 is a diagram of a subframe.

FIG. 7 is a block diagram of a subframe 700. In an aspect, the subframe 700 includes a plurality of slots, numbered 0 through 13. In an aspect, the subframe 700 may be used for sidelink transmissions for V2V communications. In an aspect, the subframe 700 may carry a physical channel. In an aspect, the subframe 700 may be included in the first signal 410.

According to aspects, the subframe 700 may carry a plurality of reference signals 702. In one aspect, a reference signal 702 may carry a sequence, which may be known for each time-frequency resource of allocation (e.g., fixed, configured dynamically by the network (e.g., the first base station 462), defined in one or more standards (e.g., 3GPP standards), or preconfigured in a UE (e.g., the vehicle 402)). In aspects, the reference signal may carry a plurality of sequences 706. For example, for V2X transmissions, the sequence 706a, 706b, 706c, 706d may repeat for every PRB pair (e.g., repetitions of length 12 in the frequency domain to span the entire transmission bandwidth). The repetition of the sequence 706a, 706b, 706c, 706d may allow for different lengths of sequences. In the illustrated aspect, the repetition of the sequence 706a, 706b, 706c, 706d may be included in one half of a last symbol of a subframe, such as a symbol that is used for transmission/reception turnaround and/or downlink timing adjustment.

Figure 8:
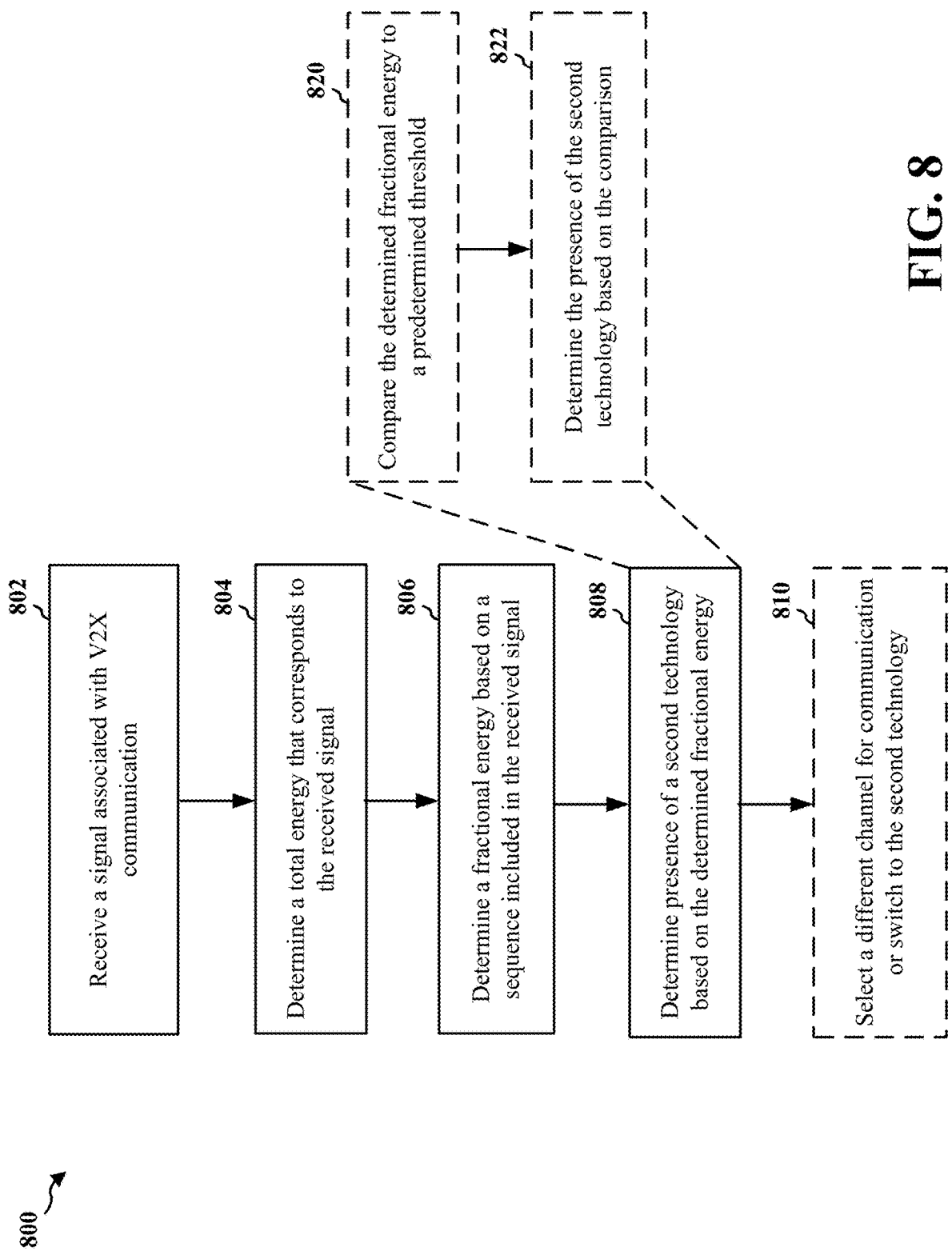
FIG. 8 is a flowchart of a method of wireless communication.

FIG. 8 is a flowchart of a method 800 of wireless communication. The method may be performed by a UE (e.g., the vehicle 402) or another apparatus. One or more operations described with respect to the method 800 may be added, omitted, and/or transposed.

At operation 802, the UE may receive signal(s) associated with V2X communication. For example, the UE may monitor one or more resources and then the UE may detect the signal(s) on the one or more resources. The signal(s) may include a signal of interest to the UE (e.g., a sequence, a pilot signal, etc.) and an interfering signal. In the context of FIG. 4, the vehicle 402 may receive the first and second signals 410, 412.

At operation 804, the UE may determine a total energy that corresponds to the received signal(s). For example, the UE may identify one or more resources that carry the signal(s), and then the UE may measure the total energy of signal(s). The UE may measure the total energy in decibels (dBs). In the context of FIG. 4, the vehicle 402 may determine a total energy that corresponds to the received first and second signals 410, 412.

At operation 806, the UE may determine a fractional energy based on a sequence included in the received signal. For example, the UE may detect a known sequence in the received signal (e.g., on one or more monitored resources) and determine the energy with which the known sequence was received (e.g., the UE may measure the portion of the energy on the one or more resource elements that corresponds to the detected sequence). The UE may determine this fractional energy as a percentage of the total energy (e.g., the UE may divide the portion of the energy on the one or more resource elements that corresponds to the detected sequence by the total energy). In the context of FIG. 4, the vehicle 402 may determine a fractional energy that corresponds to a sequence included in the first signal 410, while the total energy may be measured for both the first and second signals 410, 412.

At operation 808, the UE may determine the presence of a second technology based on the determined fractional energy. For example, the UE may compare the determined fractional energy to a predetermined threshold, and then the UE may determine the presence of the second technology based on the comparison. For example, if the fractional energy does not meet or exceed the predetermined threshold, then the UE may determine that the second technology is present (and the UE may determine that the second technology interferes with communication using the first technology). In other words, the UE may determine that the energy of the second technology may be dominate and/or may unacceptably degrade communication via the first technology. In the context of FIG. 4, the vehicle 402 may determine the presence of the second technology used by the second base station 472 based on the determined fractional energy of the sequence included in the first signal 410.

In an aspect, operation 808 includes operations 820, 822. At operation 820, the UE may compare the determined fractional energy to a predetermined threshold. For example, the UE may compare a first dB value that corresponds to the determined fractional energy to a second dB value that corresponds to the predetermined threshold. In the context of FIG. 4, the vehicle 402 may compare the determined fractional energy that is based on the first signal 410 to a predetermined threshold.

At operation 822, the UE may determine the presence of the second technology based on the comparison. For example, the UE may determine whether the fractional energy meets or exceeds the predetermined threshold, and if the fractional energy does not meet or exceed the predetermined threshold, then the UE may determine the presence of the second technology. In the context of FIG. 4, the vehicle 402 may determine the presence of the second technology that corresponds to the second signal 412, and the determination of the presence of the second technology may indicate that the second technology interferes with the communication according to the first technology.

If the presence of the second technology is detected, the method 800 may proceed to operation 810, for example, to mitigate interference at the UE. At operation 810, the UE may select a different channel or switch to the second technology. For example, the UE may determine other resources available for the UE to communicate with a serving base station, which may have been signaled to the UE (e.g., in a MIB, SIB), and the UE may select those determined resources. In another example, the UE may transmit CQI or another indication of channel quality to a serving base station, which may indicate the presence of the second technology (e.g., indicate interference introduced to the first technology). In response to the CQI, the serving base station may signal resource assignment to the UE and the UE may selected the resources indicated by the resource assignment. In another aspect, the UE may switch to the second technology by determining that the presence of the second technology is dominant relative to the first technology, and the UE may switch receive/transmission chains and/or modems of the UE to communicate according to the second technology. In an aspect, the UE may transition to a new base station that is associated with the second technology (e.g., the UE may be handed over, the UE may perform a RACH procedure with the new base station, etc.). In the context of FIG. 4, the vehicle 402 may switch to a different channel to communicate with the first base station 462 using the first technology. In another aspect, the vehicle 402 may switch to the second technology used by the second base station 472.

Figure 9:
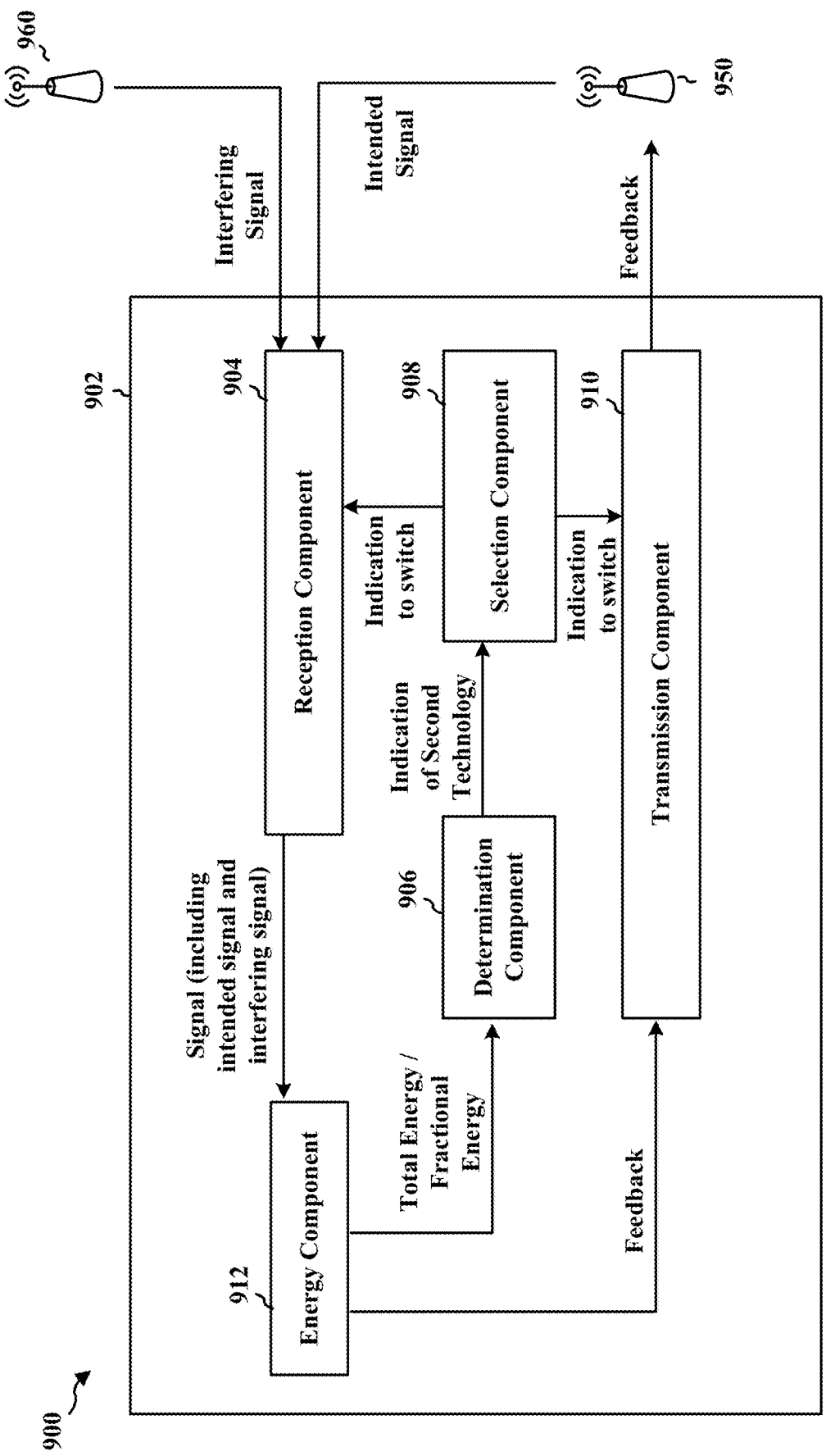
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE (e.g., the vehicle 402, the UE 104, etc.). While the diagram 900 illustrates various data flow between various components, the apparatus 902 may include additional and/or different components, as well as perform additional and/or different data flow.

The apparatus 902 may include a reception component 904 configured to receive signals. For example, the reception component 904 may receive signals from the first base station 950 and the second base station 960, which may be received on the same or overlapping resources. The first base station 950 may communicate according to a first technology (e.g., LTE, LTE-A, 5G, NR, another technology, etc.), and the second base station 960 may communicate according to a second technology (e.g., DSRC, another technology, etc.).

The apparatus 902 may include a transmission component 910 configured to transmit signals. For example, the transmission component 910 may transmit signals to the first base station 950. In one aspect, the transmission component 910 may transmit signals to the second base station 960, such as when the apparatus 902 includes a transmit chain associated with the second technology (e.g., in addition to a transmit chain associated with the first technology) and/or the apparatus 902 includes multiple modems for different technologies.

The apparatus 902 may further include an energy component 912. The energy component 912 may receive a signal through the reception component 904. The received signal may be an aggregate of an intended signal from the first base station 950 and the second base station 960—e.g., the received signal may include an intended signal (e.g., a signal from the first base station 950, a signal associated with a first technology) and an interfering signal (e.g., a signal from the second base station 960, a signal associated with a second technology). The energy component 912 may measure a total energy that corresponds to the received signal (e.g., the signal that includes both the intended signal and the interfering signal).

In aspects, the energy component 912 may determine a fractional energy of the total energy based on a sequence included in the received signal. For example, the energy component 912 may identify one or more resources that carry a sequence in the intended signal associated with the first technology, and the energy component 912 may measure the energy with which the sequence was received on the one or more resources. In one aspect, the energy component 912 may determine the fractional energy as a measured value, such as a dB value corresponding to the energy with which the sequence is received in the intended signal. In another aspect, the energy component 912 may determine the fractional energy as a percentage—e.g., by dividing the energy with which the sequence is received by the total energy of the signal that includes both the intended signal and the interfering signal.

In an aspect, the sequence may be a pilot sequence of a known length. In an aspect, the sequence may be predefined for a time-frequency resource that is allocated for the sequence. In an aspect, the sequence may be predefined. In another aspect, the energy component 912 may receive information indicating the sequence from a base station (e.g., the first base station 950). In an aspect, the sequence is repeated on a plurality of PRBs of a subframe, which may allow for different sequence lengths. In one aspect, the energy component 912 may detect the sequence in one half of a last symbol of a subframe.

The energy component 912 may provide an indication of the total energy and the fractional energy to a determination component 906. The determination component 906 may determine the presence of a second technology (e.g., associated with an interfering signal from the second base station 960) based on the determined fractional energy. In one aspect, the determination component 906 may compare the determined fractional energy to a threshold, and the determination component 906 may determine the presence of the second technology based on the comparison. For example, if the determination component 906 determines that the determined fractional energy does not meet or exceed the predetermined threshold, then the determination component 906 may determine that the second technology is dominant, unsatisfactorily degrades the intended signal, substantially interferes with the intended signal, etc. The determination component 906 may provide an indication of the determined presence of the second technology to a selection component 908.

In one aspect, the selection component 908 may select a different channel for communication based on the determined presence of the second technology. For example, the selection component 908 may provide feedback (e.g., CQI) indicating the determined presence of the second technology (e.g., indicating interference) to the first base station 950, and the first base station 950 may schedule resources for the apparatus 902 based on the feedback. The first base station 950 may indicate the scheduled resources to the selection component 908, and the selection component 908 may select those indicated resources for continuing communication with the first base station 950.

In another aspect, the selection component 908 may switch to the second technology based on the determined presence of the second technology. For example, the selection component 908 may switch transmit/receive chains of the apparatus 902 and/or switch modems of the apparatus 902 in order to communicate according to the second technology. In one aspect, the selection component 908 may select a different base station (e.g., the second base station 960) with which to communicate according to the second technology (e.g., the selection component 908 may perform a RACH procedure with the different base station).

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
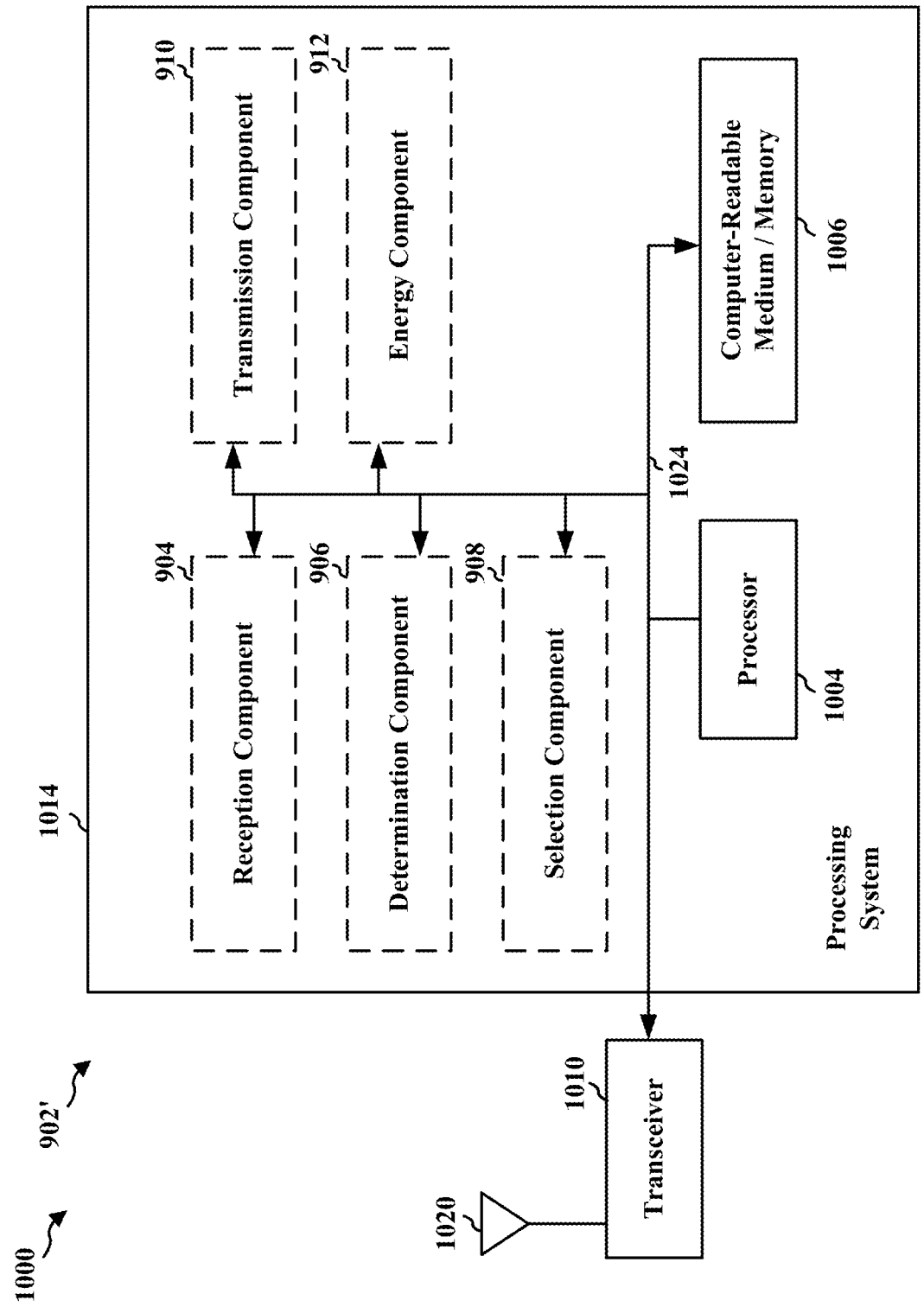
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for receiving a signal associated with V2X communication. The apparatus 902/902' may include means for determining a total energy that corresponds to the received signal. The apparatus 902/902' may include means for determining a fractional energy of the total energy based on a sequence included in the received signal, the sequence associated with a first technology. The apparatus 902/902' may include means for determining presence of a second technology based on the determined fractional energy.

In an aspect, the first technology includes one of LTE, LTE-Advanced, or 5G, and the second technology includes DSRC. In an aspect, the sequence comprises a pilot sequence of known length is used for demodulation. In an aspect, the sequence is predefined for one or more time-frequency resources allocated for the sequence. In an aspect, the sequence is predefined or dynamically configured by a base station. In an aspect, the sequence repeats on a plurality of physical resource block pairs of a subframe. In an aspect, the sequence is included in one half of a last symbol of a subframe.

In an aspect, the means for determining presence of a second technology based on the determined fractional energy is configured for comparing the determined fractional energy to a predetermined threshold; and determining the presence of the second technology based on the comparison.

In an aspect, the apparatus 902/902' may include means for selecting a different channel for communication based on the determined presence of the second technology; or the apparatus 902/902' may include means for switching to the second technology for communication based on the determined presence of the second technology.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
    receiving a signal associated with vehicle-to-everything (V2X) communication;
    determining a total energy that corresponds to the received signal;
    determining a fractional energy of the total energy based on a sequence of known length included in the received signal, the sequence associated with a first technology;
    determining presence of a second technology when the determined fractional energy of the total energy fails to satisfy a threshold, wherein the determined fractional energy of the total energy fails to satisfy the threshold when the determined fractional energy is less than the threshold, wherein the second technology is dominant relative to or interferes with the first technology; and
    switching to the second technology for communication based on the determined presence of the second technology.

2. The method of claim 1, wherein the first technology includes one of Long Term Evolution (LTE), LTE-Advanced, or fifth generation (5G), and wherein the second technology includes Dedicated Short Range Communications (DSRC).

3. The method of claim 1, wherein the sequence comprises a pilot sequence of known length associated with demodulation.

4. The method of claim 3, wherein the sequence is predefined for one or more time-frequency resources allocated for the sequence.

5. The method of claim 1, wherein the sequence is predefined or dynamically configured by a base station.

6. The method of claim 1, wherein the sequence repeats on a plurality of physical resource block pairs of a subframe.

7. The method of claim 1, wherein the sequence is included in one half of a last symbol of a subframe.

8. The method of claim 1, wherein the determining the presence of the second technology when the determined fractional energy of the total energy fails to satisfy the threshold comprises:
    comparing the determined fractional energy to the threshold; and
    determining the presence of the second technology when the determined fractional energy fails to satisfy the threshold based on the comparison.

9. The method of claim 1, further comprising:
    selecting a different channel for communication based on the determined presence of the second technology.

10. An apparatus for wireless communication, comprising:
    means for receiving a signal associated with vehicle-to-everything (V2X) communication;
    means for determining a total energy that corresponds to the received signal;
    means for determining a fractional energy of the total energy based on a sequence of known length included in the received signal, the sequence associated with a first technology;
    means for determining presence of a second technology when the determined fractional energy of the total energy fails to satisfy a threshold, wherein the determined fractional energy of the total energy fails to satisfy the threshold when the determined fractional energy is less than the threshold, wherein the second technology is dominant relative to or interferes with the first technology; and
    means for switching to the second technology for communication based on the determined presence of the second technology.

11. The apparatus of claim 10, wherein the first technology includes one of Long Term Evolution (LTE), LTE-Advanced, or fifth generation (5G), and wherein the second technology includes Dedicated Short Range Communications (DSRC).

12. The apparatus of claim 11, wherein the sequence is predefined for one or more time-frequency resources allocated for the sequence.

13. The apparatus of claim 10, wherein the sequence comprises a pilot sequence of known length associated with demodulation.

14. The apparatus of claim 10, wherein the sequence is predefined or dynamically configured by a base station.

15. The apparatus of claim 10, wherein the sequence repeats on a plurality of physical resource block pairs of a subframe.

16. The apparatus of claim 10, wherein the sequence is included in one half of a last symbol of a subframe.

17. The apparatus of claim 10, wherein the means for determining presence of the second technology is configured to:
compare the determined fractional energy to the threshold; and
determine the presence of the second technology when the determined fractional energy fails to satisfy the threshold based on the comparison.

18. The apparatus of claim 10, further comprising:
means for selecting a different channel for communication based on the determined presence of the second technology.

19. An apparatus for wireless communication, comprising:
a memory; and
at least one processor coupled to the memory and configured to:
receive a signal associated with vehicle-to-everything (V2X) communication;
determine a total energy that corresponds to the received signal;
determine a fractional energy of the total energy based on a sequence of known length included in the received signal, the sequence associated with a first technology; and
determine presence of a second technology when the determined fractional energy of the total energy fails to satisfy a threshold, wherein the determined fractional energy of the total energy fails to satisfy the threshold when the determined fractional energy is less than the threshold, wherein the second technology is dominant relative to or interferes with the first technology; and
switch to the second technology for communication based on the determined presence of the second technology.

20. The apparatus of claim 19, wherein the first technology includes one of Long Term Evolution (LTE), LTE-Advanced, or fifth generation (5G), and wherein the second technology includes Dedicated Short Range Communications (DSRC).

21. The apparatus of claim 19, wherein the sequence comprises a pilot sequence of known length associated with demodulation.

22. The apparatus of claim 21, wherein the sequence is predefined for one or more time-frequency resources allocated for the sequence.

23. The apparatus of claim 19, wherein the sequence is predefined or dynamically configured by a base station.

24. The apparatus of claim 19, wherein the sequence repeats on a plurality of physical resource block pairs of a subframe.

25. The apparatus of claim 19, wherein the sequence is included in one half of a last symbol of a subframe.

26. The apparatus of claim 19, wherein the determination of the presence of the second technology when the determined fractional energy of the total energy fails to satisfy the threshold comprises to:
compare the determined fractional energy to the threshold; and
determine the presence of the second technology when the determined fractional energy fails to satisfy the threshold based on the comparison.

27. The apparatus of claim 19, wherein the at least one processor is further configured to:
select a different channel for communication based on the determined presence of the second technology.

28. A non-transitory, computer-readable medium storing computer executable code for wireless communication, comprising code to:
receive a signal associated with vehicle-to-everything (V2X) communication;
determine a total energy that corresponds to the received signal;
determine a fractional energy of the total energy based on a sequence of known length included in the received signal, the sequence associated with a first technology;
determine presence of a second technology when the determined fractional energy of the total energy fails to satisfy a threshold, wherein the determined fractional energy of the total energy fails to satisfy the threshold when the determined fractional energy is less than the threshold, wherein the second technology is dominant relative to or interferes with the first technology; and
switch to the second technology for communication based on the determined presence of the second technology.

* * * * *